J. ROSENBERG & R. GLABAZNYA.
AIRSHIP.
APPLICATION FILED SEPT. 19, 1910.
1,010,076.
Patented Nov. 28, 1911.
4 SHEETS—SHEET 1.
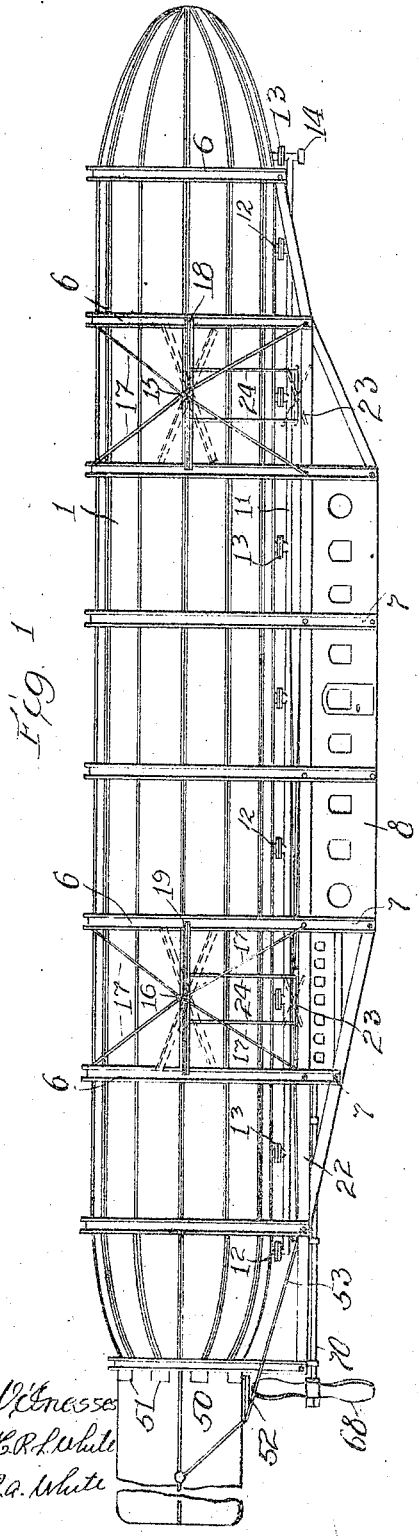
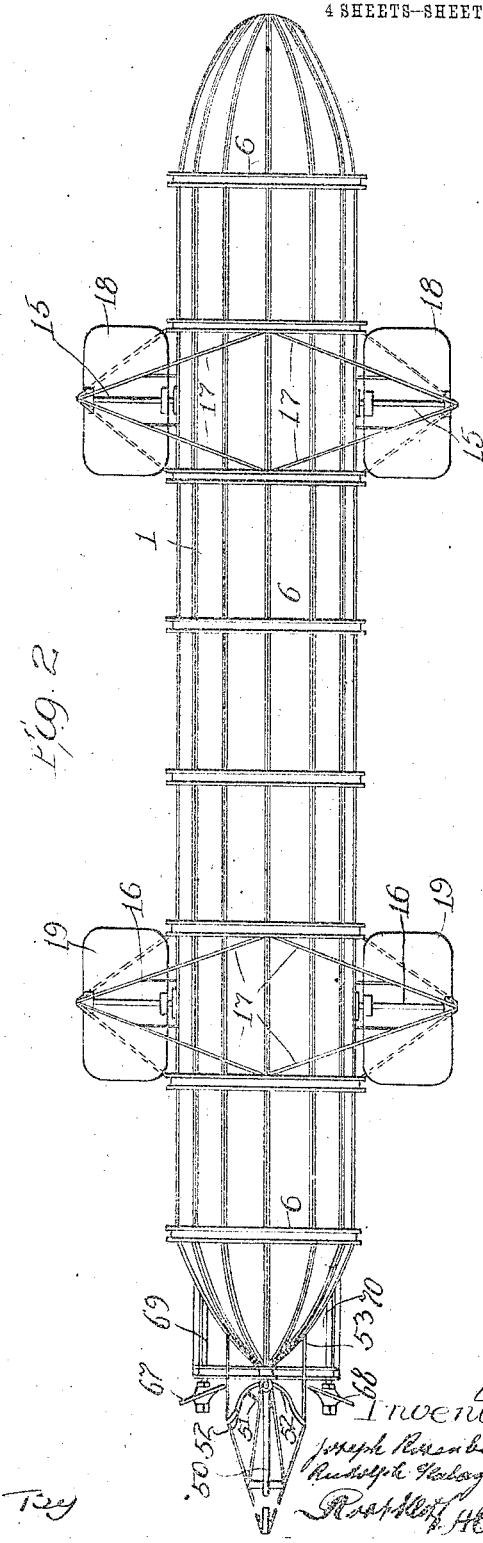

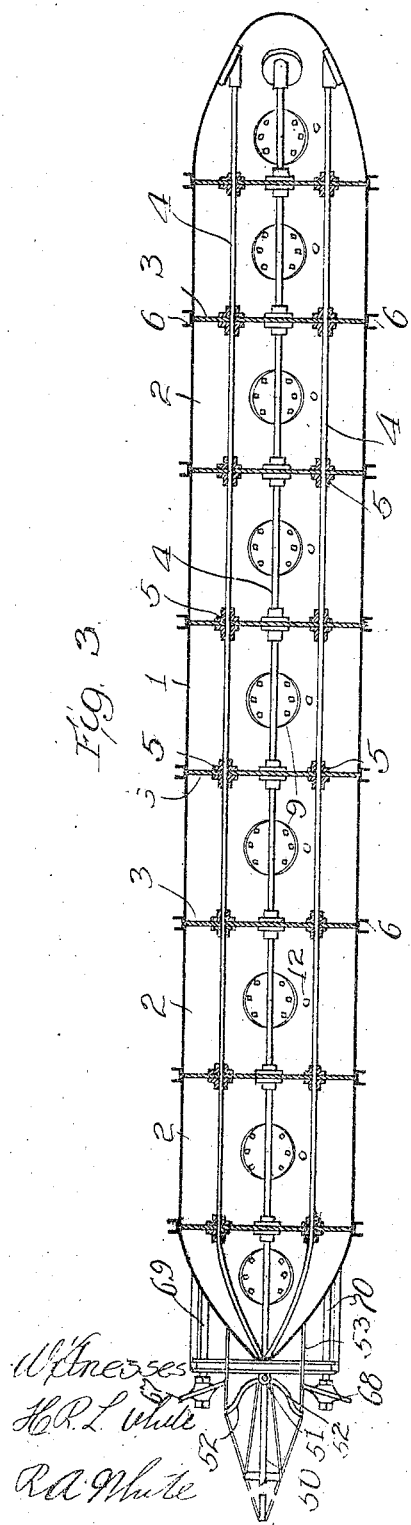
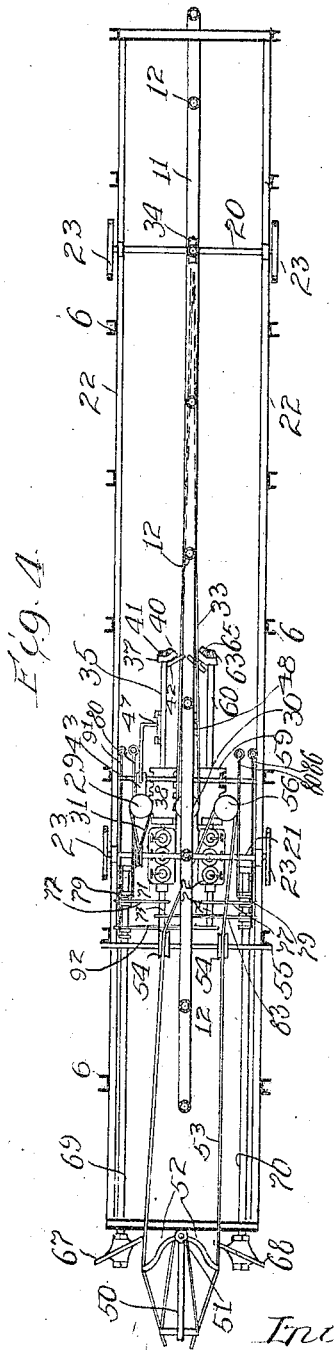

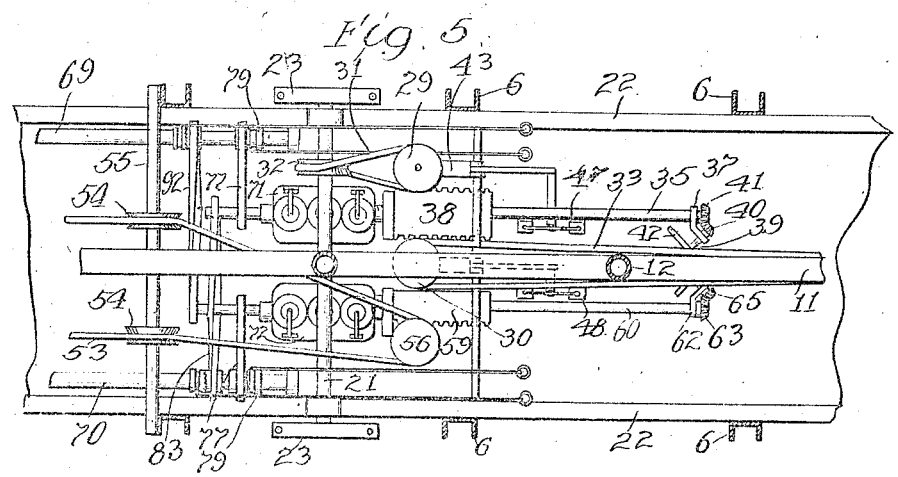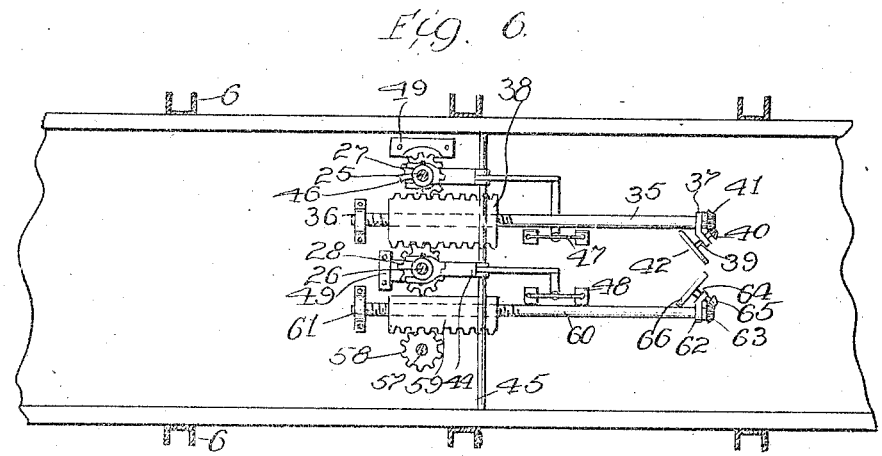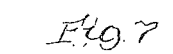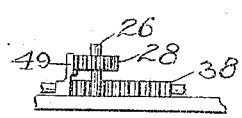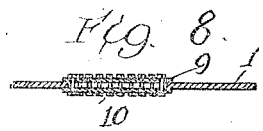

J. ROSENBERG & R. GLABAZNYA.
AIRSHIP.
APPLICATION FILED SEPT. 19, 1910.
1,010,076.
Patented Nov. 28, 1911.
4 SHEETS—SHEET 4.
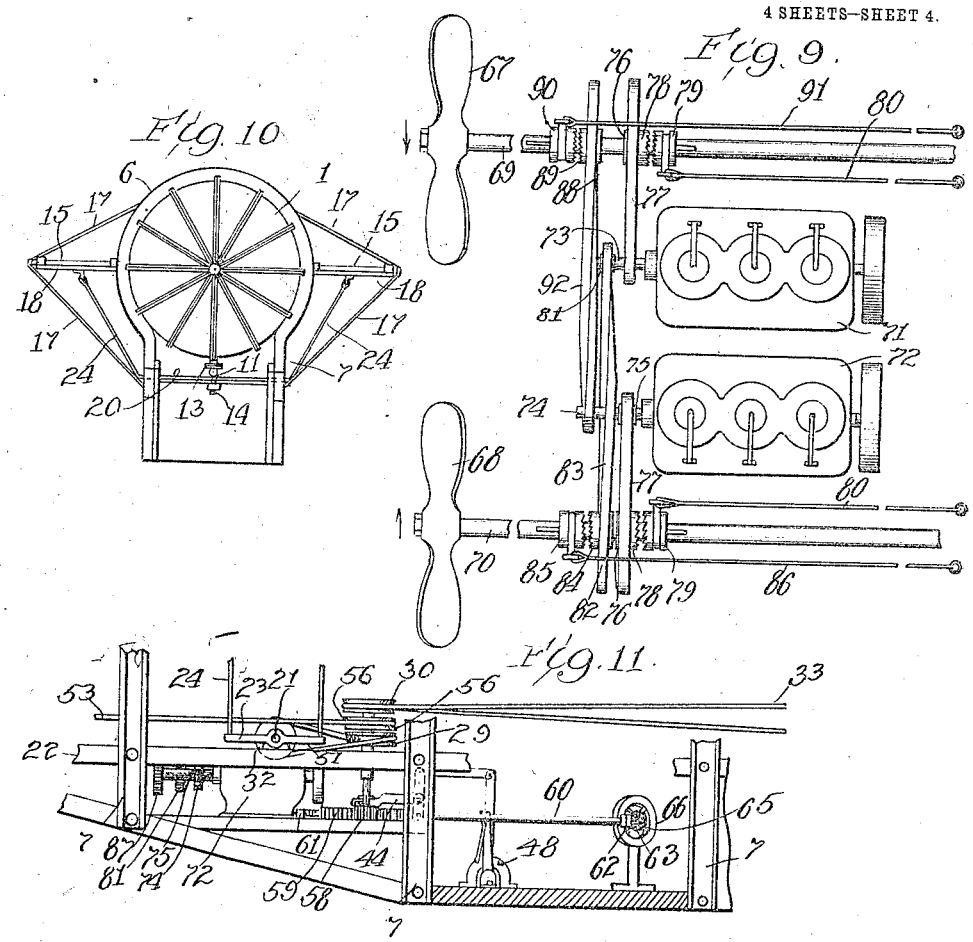
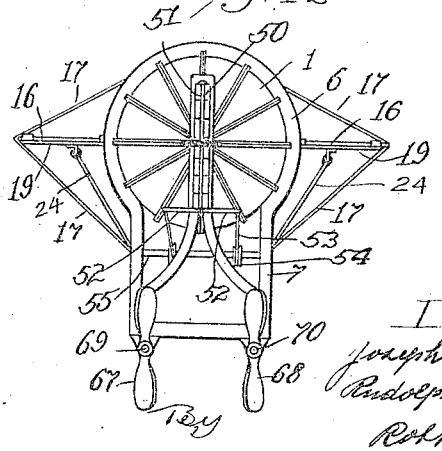

UNITED STATES PATENT OFFICE.

JOSEPH ROSENBERG AND RUDOLPH GLABAZNYA, OF CHICAGO, ILLINOIS.

AIRSHIP.

1,010,076.　　　　　　Specification of Letters Patent.　　Patented Nov. 28, 1911.

Application filed September 19, 1910. Serial No. 582,593.

*To all whom it may concern:*

Be it known that we, JOSEPH ROSENBERG and RUDOLPH GLABAZNYA, subjects of the Emperor of Austria-Hungary, and residing in Chicago, in the county of Cook and State of Illinois, have invented a new and useful Improvement in Airships, of which the following is a complete specification.

The main objects of this invention are to provide an air-ship of very strong, light and durable construction and which is adapted to be easily controlled by the operator; to provide an air-ship which is so constructed that injury to any of the compartments of the gas container will not sufficiently decrease its lifting capacity as to cause the loss of its control; to provide an air-ship in which the operating and controlling mechanism has been greatly simplified; and to provide an air-ship which is so positive in its operation that the operator may at all times keep it in perfect control.

A specific embodiment of the invention is illustrated in the accompanying drawings, in which:

Figure 1 is a side elevation of an air-ship embodied in this invention. Fig. 2 is a top plan view of the same. Fig. 3 is a horizontal section of the gas container. Fig. 4 is a horizontal section taken beneath the gas container and showing the operating mechanism in plan view. Fig. 5 is an enlarged fragmentary section showing the operating mechanism in plan view. Fig. 6 is a view similar to Fig. 5 but showing only the operating mechanism for the rudder and planes in plan view. Fig. 7 is a fragmentary section of the means for locking the planes when the operating mechanism therefor is out of gear. Fig. 8 is a fragmentary section of the gas container, showing the means for closing one of the gas compartments. Fig. 9 is a fragmentary plan view of the motors and propellers. Fig. 10 is a front elevation of the air-ship. Fig. 11 is a fragmentary view partly in section and partly in side elevation showing the operating mechanism with parts removed. Fig. 12 is a rear end elevation of the air-ship.

In the construction shown, the gas container 1 is preferably cylindrical in shape and has tapered ends to reduce the air resistance. Said container may be constructed of any preferred size, dependent upon the lifting capacity desired, and is preferably formed of aluminum to give the desired strength and rigidity without excessive weight. The container 1 is divided into compartments 2—2 by means of transverse partitions 3—3, which partitions are strengthened and braced by longitudinally extending rods or bars 4 which are secured at their ends to the end walls of the container 1 and to the partitions by means of flanged clamping members 5 which are carried on said rods and abut on both sides of the partitions. Rigidly secured on the container over the partitions 3 are the supporting hoops 6, which are preferably formed of channel bars, and have their lower portions 7 rectangular in shape and depending below the container to support the cabin 8 and the operating mechanism.

Each compartment 2 is provided with a door or port-hole by means of which access may be had to the interior to make repairs or for other purposes. Each door is normally closed by a lid 9 which is formed of outer and inner plates adapted to overlap the margins of the door, and are bolted in place by bolts 10 which pass through said plates as shown more clearly in Fig. 8. For the purpose of filling the compartment with gas a pipe 11 extends longitudinally beneath the container and has branch pipes 12 leading into each compartment. Each branch is provided with a valve 13 adapted to retain the gas in the compartment. The pipe 11 is provided at its forward end with a valved connection 14 which is adapted to be connected with a pipe from a suitable source of gas supply, not shown.

Extending laterally from each side of the container, and near the ends thereof, are stationary shafts 15 and 16 which are arranged in front and rear pairs. Brace rods 17 extend from the outer end of each shaft 15—16 inwardly, and both upwardly and downwardly to the hoops 6 and act to brace the shafts. On the front shafts 15 are pivoted planes 18, and on the rear shafts 16 are pivoted planes 19. Said planes serve to guide the air-ship upwardly and downwardly or maintain it in a horizontal course.

For the purpose of operating and controlling the planes 18 and 19, a front transverse rock-shaft 20 and a rear transverse rock-shaft 21 are journaled in suitable bearings on the longitudinal frame members 22 which are connected to the portions 7 of the hoops. On the ends of the rock-shafts 20 and 21 are arms 23 which extend longitudinally of the air-ship and from both sides of the shafts. Cables or rods 24 extend from the ends of the arms 23 upwardly and are connected to the planes at each side of the pivotal points of the planes. When the shafts 20 and 21 are rocked the cables 24 tilt the planes at an angle to the horizontal.

Journaled on the frame near the rear end of the machine are the vertical shafts 25 and 26 which are provided at their lower ends with pinions 27 and 28 which are slidably but non-rotatively mounted on said shafts. At the upper ends of said shafts are sheaves 29 and 30 respectively. A belt 31 is carried on the sheave 29 and a sheave 32 on the shaft 21. A belt 33 is carried on the sheave 30 and a sheave 34 on the shaft 20. For the purpose of operating the shafts 25 and 26 a horizontal screw-shaft 35 is journaled in bearings 36 and 37 on the frame. Mounted on the threaded portion of the shaft 35 is a double rack 38 which lies between the shafts 25 and 26 and is adapted to mesh with the gears 27 and 28. A shaft 39 is journaled in the bearing 37 at an angle to shaft 35. On one end of the shaft 39 is a beveled pinion 40 which meshes with a pinion 41 on the forward end of the shaft 35, and on the other end of the shaft 39 is a hand wheel 42. When the shaft 39 is rotated it imparts rotation to the shaft 35 thereby moving the rack longitudinally and rotating the shafts 25 and 26 if the gears 27 and 28 are in mesh with said rack.

For the purpose of throwing the gears 27 and 28 out of mesh with the rack, bell crank levers 43 and 44 are journaled on a fixed shaft 45, which is carried on the frame, and one arm of each lever is forked and engages beneath a flange 46 on the gear. Connected to the other arms of the levers 43 and 44 by means of toggle bars are the detent levers 47 and 48 by means of which the levers 43 and 44 may be rocked on the shaft 45 to raise or lower the gears 27 and 28 on the shafts 25 and 26, and thereby throw them out of or into mesh with said rack.

For the purpose of locking the shafts 25 and 26 from rotation when the gears 27 and 28 are out of mesh with the rack 38, a bracket 49 is supported at one side of each gear and has teeth in its upper end into which the gear teeth mesh when the gear teeth are raised out of engagement with the rack, thereby holding the shafts from rotation.

A rudder 50 is hinged at 51 on the frame at the rear end of the container 1, and is adapted to swing laterally. At the forward end of the rudder are laterally directed arms 52. A cable 53 is connected at its ends to said arms and extends forwardly over sheaves 54 on a shaft 55 which is carried on the frame. Said cable then extends around a sheave 56 which is carried on the upper end of a vertical shaft 57, which is also journaled on the frame. Rigidly secured on the lower end of the shaft 57 is a gear 58 which meshes with a rack 59, which is movably mounted on a screw-shaft 60. The screw-shaft 60 is journaled in bearings 61 and 62, which are carried on the frame, and on the forward end of the shaft 60 is a beveled pinion 63. A shaft 64 is journaled in the bearing 62 and is provided on one end with a pinion 65 which meshes with the pinion 63, and on its other end is provided with a hand wheel 66.

The air-ship is provided with two propellers 67 and 68 which are mounted on propeller shafts 69 and 70, which are journaled one on each side of the frame, at the rear thereof.

Motors 71 and 72 are carried on the frame beneath the container and mechanism is provided whereby either or both propellers may be driven by either or both motors. For this purpose the motor shafts 73 and 74 are each provided with a fixed sprocket wheel 75 and each propeller shaft is provided with a loose sprocket wheel 76 in alinement with the adjacent sprocket wheel 75, and sprocket chains 77 are carried on said sprocket wheels. Each sprocket wheel 76 is provided with a clutch member 78 which is adapted to be engaged by a clutch member 79 slidably mounted on the propeller shaft. Said clutch members 79 may be operated by rods or bars 80. On the motor shaft 73 is a sprocket wheel 81 which is in alinement with a sprocket wheel 82 which is loosely mounted on the propeller shaft 70. A sprocket chain 83 is carried on the wheels 81 and 82. The wheel 82 is provided with a clutch member 84, which is adapted to be engaged by a clutch member 85 slidably mounted on the propeller shaft 70. A rod 86 is provided for operating the clutch member 85. The motor shaft 74 is provided with a sprocket wheel 87 which is in alinement with a sprocket wheel 88 loosely mounted on the propeller shaft 69. The wheel 88 is provided with a clutch member 89 which is adapted to be engaged by a clutch member 90 slidably mounted on the shaft 69. A rod 91 is provided for operating the member 90. A sprocket chain 92 is carried on the wheels 87 and 88 and acts to drive the propeller shaft 69 from the motor 72.

The operation of the construction shown is as follows: The gas compartments 2 are sufficiently filled with gas to cause the airship to ascend. The motors are then started with the clutches 79 in operative position, thereby causing each motor to drive the propeller shaft at its side of the ship, and move the ship forwardly. When it is desired to change the altitude of the ship, both the front and rear planes may be simultaneously operated by rotation of the shaft 35 when both of the gears 27 and 28 are in mesh with the rack 38. If it is desired to tilt either the front or rear planes separately, the gear 27 or 28 which controls the planes that are to remain stationary is thrown out of engagement with the rack and into engagement with the teeth of the bracket 49 by means of the detent lever 47 or 48. Then when the shaft 35 is rotated it will only operate one set of planes, or that governed by the gear which remains in mesh with the rack 38.

To steer the device the shaft 60 is rotated thereby causing the rack 59 to rotate the shaft 57 and turn the rudder 50.

If desired the propeller clutches may be so manipulated that both propellers may be driven from both motors, or in case one motor should get out of service both propellers may be driven from one motor.

In the event of damage to any one of the compartments sufficient to permit the gas in that compartment to escape, the gas in the remaining compartments will still keep the air-ship up until a suitable landing can be effected. The cover 9 of the damaged compartment can then be removed and the damage repaired.

While we have shown and described but one specific embodiment of our invention it will be understood that many details of the construction shown may be varied or omitted without departing from the scope of the claims.

We claim:

1. An air-ship, comprising a gas container having compartments therein, means for individually filling and controlling the contents of the compartments, a plurality of inverted U shaped hoops secured circumferentially around the container and depending below the same, one over each of the partitions separating the compartments, and operating mechanism supported on the ends of the hoops beneath the container.

2. An air-ship, comprising a gas container, laterally disposed front and rear planes pivotally mounted on the container, individual operating means for said planes each having a pinion associated therewith, a rack adapted to be connected with said pinions to simultaneously operate the planes, means for operating the rack, means for individually disconnecting the pinions from the rack, and means adapted to individually lock the plane operating means from movement when the pinions are disconnected from the rack.

3. An air-ship, comprising a container, front and rear laterally disposed planes pivoted on the container, a double rack supported beneath the container, individual plane operating mechanisms connected with the rack, means for operating said rack and simultaneously operating the front and rear planes, means for individually throwing the plane operating mechanisms out of engagement with the rack, means for locking said mechanisms against operation when out of engagement with the rack, and means for propelling the air-ship.

4. An air-ship, comprising a gas container, front and rear laterally disposed planes pivoted on the container, rock-shafts supported beneath said planes, means connecting said shafts with the planes and adapted to tilt the planes when the shafts are rocked, rack and pinions connected with and adapted to simultaneously rock said shafts and thereby simultaneously tilt the planes, means adapted to individually disconnect the pinions from the rack, means adapted to engage the pinions when disconnected from the rack and lock each shaft from rotation independently of the other, and means adapted to propel the air-ship.

5. An air-ship, comprising a gas container, front and rear, laterally disposed planes pivotally mounted on the container, rock-shafts beneath the planes, mechanism connecting said shafts with said planes, a rotative screw-shaft, a double rack mounted on said screw-shaft, vertical shafts journaled one on each side of said rack, gears slidably keyed on said vertical shafts and adapted to mesh with said rack, operative connections between the vertical shafts and rock-shafts, means adapted to throw each gear out of engagement with the rack, means adapted to lock the gears from rotation when out of engagement with the rack, and means for propelling the air-ship.

6. An air-ship, comprising a gas container, front and rear laterally disposed planes pivotally mounted on the container, rock-shafts beneath the planes, mechanism connecting said rock-shafts with said planes, a rotative screw-shaft, a double rack movably mounted on said screw-shaft, vertical shafts journaled at the sides of said rack, gears slidably keyed on said vertical shafts and adapted to mesh with said rack, operative connections between the vertical shafts and rock-shafts, means adapted to throw each gear out of engagement with the rack, means adapted to lock the gears from rotation when out of engagement with the rack, a rudder pivoted on the rear of the container, a rudder operating screw-shaft beneath the container, a traveling rack thereon, operative connections between said rack and rudder, and means for propelling the air-ship.

7. An air-ship, comprising a gas container, front and rear laterally disposed planes pivoted on the container, a screw-shaft mounted beneath the container, separate mechanisms operated by said shaft and adapted to simultaneously operate the front and rear planes, means for throwing either of said mechanisms out of connection with said shaft, means for locking such mechanism against movement when out of connection with the shaft, a rudder, a rudder operating screw-shaft journaled beneath the container, a rack movably mounted on said shaft, operative connections between the rack and rudder, and means for propelling the air-ship.

8. An air-ship, comprising a gas container having compartments therein, means for filling said compartments with gas, inverted U shaped hoops secured on the container and having their ends depending below the same, a cabin supported on the ends of said hoops, a pair of motors supported on said hoops beneath the container, a pair of propeller shafts, one at each side of the ship, propellers on said shafts, mechanism connecting the motors with said shafts and adapting either or both shafts to be driven from either or both motors, a rudder, front and rear pivoted planes on the container, and means for operating said rudder and planes.

In testimony whereof we have hereunto subscribed our names in the presence of two witnesses.

JOSEPH ROSENBERG.
RUDOLPH GLABAZNYA.

Witnesses:
JOSEPH SCHLENKER,
CARL HAERTING.